(12) United States Patent
Tamura et al.

(10) Patent No.: US 10,168,554 B2
(45) Date of Patent: Jan. 1, 2019

(54) PHOTOCHROMIC LENS (71) Applicant: Talex Optical Co., Ltd., Osaka (JP)

(72) Inventors: Kanichi Tamura, Osaka (JP); Shoichi Mitsuuchi, Osaka (JP); Kenzo Wada, Osaka (JP); Atsushi Takata, Kyoto (JP)

(73) Assignee: TALEX OPTICAL CO., LTD., Osaka (JP)

( * ) Notice: Subject to any disclaimer, the term of this patent is extended or adjusted under 35 U.S.C. 154(b) by 0 days.

(21) Appl. No.: 13/667,183

(22) Filed: Nov. 2, 2012

(65) Prior Publication Data
US 2014/0036227 A1 Feb. 6, 2014

(30) Foreign Application Priority Data
Aug. 2, 2012 (JP) .................. 2012-171927

(51) Int. Cl.
G02C 7/02 (2006.01)
G02C 7/12 (2006.01)
G02C 7/10 (2006.01)
G02B 5/23 (2006.01)

(52) U.S. Cl.
CPC ............... *G02C 7/12* (2013.01); *G02C 7/102* (2013.01); *G02B 5/23* (2013.01); *G02C 2202/16* (2013.01)

(58) Field of Classification Search
CPC ........ G02B 5/23; G02B 5/30; G02C 2202/16; G02C 7/102; G02C 7/12
USPC .................................................. 428/410, 420
See application file for complete search history.

(56) References Cited

U.S. PATENT DOCUMENTS

| | | | | |
|---|---|---|---|---|
| 4,166,043 A * | 8/1979 | Uhlmann et al. | ............. | 252/600 |
| 4,699,473 A * | 10/1987 | Chu | .............................. | 359/355 |
| 4,913,544 A * | 4/1990 | Rickwood et al. | ...... | 351/159.61 |
| 4,962,178 A * | 10/1990 | Harisiades | ........... | A61K 9/7069 |
| | | | | 525/453 |
| 5,411,679 A * | 5/1995 | Kumar | ................. | C07D 493/04 |
| | | | | 252/586 |
| 5,556,929 A * | 9/1996 | Yokoyama | ............ | C08F 220/54 |
| | | | | 523/107 |
| 5,733,519 A * | 3/1998 | Gard | ............................. | 423/305 |
| 5,914,193 A * | 6/1999 | Ono et al. | ...................... | 428/451 |
| 6,083,427 A * | 7/2000 | Henry | ........................... | 252/586 |
| 6,141,135 A * | 10/2000 | Nagoh et al. | ................. | 359/241 |
| 6,719,812 B1 * | 4/2004 | Kitchloo et al. | .................. | 8/485 |
| 7,035,010 B2 | 4/2006 | Iori et al. | | |
| 2003/0179459 A1 * | 9/2003 | Hayashi | ....................... | 359/642 |

(Continued)

FOREIGN PATENT DOCUMENTS

JP 63-175071 7/1988
JP 2006-502423 1/2006

OTHER PUBLICATIONS

STIC search, Jul. 8, 2014.*

*Primary Examiner* — Michael B Nelson
(74) *Attorney, Agent, or Firm* — Wenderoth, Lind & Ponack, L.L.P.

(57) ABSTRACT

A photochromic lens is proposed which can lose its color in a shorter period of time, and which is less likely to deteriorate when exposed to ultraviolet radiation. The photochromic lens is formed by dissolving 0.03 to 0.2 parts by mass of a spirooxazine photochromic compound in tetrahydrofuran, mixing the solution thus obtained into 100 parts by mass of a lens resin material so that the photochromic compound is uniformly dispersed in the resin material.

12 Claims, 4 Drawing Sheets

(56) References Cited

U.S. PATENT DOCUMENTS

| | | | |
|---|---|---|---|
| 2004/0180211 A1* | 9/2004 | Moravec | C08K 5/3435 428/422.8 |
| 2005/0202267 A1 | 9/2005 | Ha et al. | |
| 2010/0249264 A1* | 9/2010 | Hu | C08G 18/4277 523/105 |

\* cited by examiner

PHOTOCHROMIC LENS

CROSS REFERENCE TO RELATED APPLICATIONS

This application is based on and claims priority under 35 U.S.C. sctn. 119 with respect to Japanese Patent Application No. 2012-171927 filed on Aug. 2, 2012, the entire content of which is incorporated herein by reference.

BACKGROUND OF THE INVENTION

The present invention relates to a photochromic lens having the lighting control function.

Photochromic lenses are known having a lighting control function utilizing a photochromic compound, which is capable of reversible isomerization between two states in which the absorption spectra are different from each other, under the influence of light and without changing the molecular weight thereof.

Some known photochromic lenses are made of glass, while others are made of a resin. Some of such resin photochromic lenses have a photochromic coating surface layer formed on the lens substrate, and others include a resin lens substrate in which a photochromic compound is dispersed.

Known photochromic compounds used in such resin photochromic lenses include spirooxazine compounds and tetra- (or hexa-)benzoperopyrene compounds.

Of these photochromic compounds, spirooxazine compounds show a tendency that their weather resistance decreases when exposed to ultraviolet rays of short wavelengths. Thus a spirooxazine compound is used in the form of particulates enclosed in light-shielding inorganic films and dispersed in a resin matrix (JP Patent Publication 63-175071A; Patent document 1).

An optical member is known which includes a polarizing film and a coating layer or layers covering one or both sides of the polarizing film, the coating layer or layers being made of a polyurethane material containing 0.05 to 2.0% by weight of a spirooxazine compound as a lighting control (photochromic) compound (U.S. Pat. No. 7,035,010; Patent document 2).

A coating solution composition for lighting control plastic lenses is known which contains a spirooxazine compound which changes color by light and which is dissolved in toluene or ethylene chloride (JP Patent Publication 2006-502423, paragraph 0016; Patent document 3).

There are only two known methods for mixing a conventional spirooxazine compound in resin, which are: enclosing particulates of a spirooxazine compound in light-shielding inorganic films and dispersing them in a resin matrix (Patent document 1); and adding a spirooxazine compound to a polyurethane resin (Patent document 2). Hexane, xylene, toluene, methylene chloride and ethyl acetate are the only organic solvents that are known to be suitable for use with a spirooxazine compound (Patent document 3).

None of the methods disclosed in these prior art references can sufficiently exhibit the photochromic properties of a spirooxazine compound. In particular, with these methods, the spirooxazine compound is not colored sufficiently when exposed to strong ultraviolet radiation in a bright environment, and also, a long time is needed until the color disappears when the compound is thereafter placed in a dark place where the ultraviolet radiation is low. In particular, it takes about 15 minutes until the color disappears completely.

The longer it takes until the color disappears, the more remarkable the variation in color tone if a plurality of photochromic pigments are used, because the speeds at which the respective pigments lose colors are different. This means that the color tone in a bright place is markedly different from the color tone in a dark place.

If a lens is placed in an environment where the lens is exposed to a high dose of ultraviolet radiation, it is known that the lens deteriorates to the depth of about 0.5 mm. Photochromic eyeglasses are known of which the surface layers of the lenses are coated with or impregnated with a photochromic compound (and not with an ultraviolet absorbent).

One problem with this type of eyeglass lenses is the short duration of their photochromic properties. That is, ordinarily, such lenses completely lose their photochromic properties in two years.

If particles of a photochromic compound are wrapped in inorganic films which can reflect ultraviolet radiation and dispersed in a resin matrix in order to improve the weather resistance of the photochromic compound, the films tend to interfere with the ability of the photochromic pigment to reveal and lose its color.

If a photochromic compound is used in such a manner that the photochromic compound cannot sufficiently exhibit its photochromic properties, it is necessary to use an increased amount of this compound to obtain sufficient photochromic properties. This slows down the speed with which the photochromic compound can lose its color.

SUMMARY OF THE INVENTION

An object of this invention is to provide a photochromic lens which is free of the above-mentioned problems, which can lose its color in a minimum time period, and which is least likely to be deteriorated when exposed to ultraviolet radiation and is sufficiently weather-resistant, and a method of efficiently producing such a photochromic lens.

The present invention provides a photochromic lens comprising a resin lens substrate comprising 100 parts by mass of a resin lens material and 0.03 to 0.2 parts by mass of a spirooxazine photochromic compound which is mixed with and uniformly dispersed in the resin lens material while being dissolved in tetrahydrofuran.

[Chemical Formula 1]

By dissolving a spirooxazine photochromic compound, preferably the spirooxazine compound having the above specific molecular structure, in tetrahydrofuran, the compound can be more uniformly dispersed in the resin than when this compound is dissolved in any other organic solvent.

Thus, even if its content is low, the photochromic compound sufficiently reveals the photochromic properties intrinsic to this compound. By using a smaller amount of this compound, it is possible to shorten the time necessary for the compound to lose its color.

Since the photochromic compound is dissolved in tetrahydrofuran, the compound is uniformly dispersed in the resin. Thus, the lens would ordinarily deteriorate only at its portion to the depth of about 0.5 mm from its surface under ultraviolet radiation, and its deeper portion will never deteriorate. As a whole, the lens shows excellent weather resistance.

In order to further improve its weather resistance, a protective layer is preferably formed on the surface of the photochromic lens substrate.

The protective layer preferably contains an ultraviolet reflecting agent and an antioxidant to reflect ultraviolet radiation with the protective layer, thus preventing ultraviolet radiation from being absorbed into the surface layer of the lens substrate. This in turn prevents deterioration of the photochromic compound contained in the lens substrate, thus improving the weather resistance of the lens.

An antioxidant is preferably added to the protective layer in order to more reliably prevent deterioration of the photochromic compound present in the surface layer of the lens substrate.

Further preferably, a metal deposition layer is formed on the surface of the protective layer, which can reflect ultraviolet radiation, thereby more reliably preventing deterioration of the photochromic compound by preventing ultraviolet radiation from penetrating through the surface layer of the lens and reaching a deeper portion of the lens.

Resins usable as the resin lens material include, but are not limited to, polyurethane resins, thiourethane resins, allyl diglycol carbonate resins, polycarbonate resins, and (polyester)methacrylate resins.

The present invention provides a method of reliably and efficiently producing the above-described photochromic lens, the method comprising dissolving 0.03 to 0.2 parts by mass of a spirooxazine photochromic compound, preferably the spirooxazine photochromic compound expressed by Chemical Formula 1, in tetrahydrofuran to obtain a solution, mixing the solution into 100 parts by mass of a resin lens material to produce a mixture, deaerating the mixture to volatilize the tetrahydrofuran, and forming the mixture into the photochromic lens by casting.

By volatilizing the tetrahydrofuran, the spirooxazine photochromic compound stabilizes in a dispersed state. Volatilization also prevents fine bubbles when forming the lens by casting, which allows reliable and efficient production of the photochromic lens.

According to the present invention, since a predetermined amount of a spirooxazine photochromic compound is first dissolved in tetrahydrofuran, and then mixed into the resin lens material, the photochromic compound can be uniformly dispersed in the resin lens material. The lens thus obtained can lose its color in the shortest possible period of time and is weather-resistant.

By using the method of producing the above-described photochromic lens which comprises dissolving a spirooxazine photochromic compound in tetrahydrofuran, mixing the thus obtained solution into a resin lens material, deaerating the thus obtained mixture to volatilize the tetrahydrofuran, and forming the mixture into the photochromic lens by casting, the photochromic lens according to the present invention can be produced reliably and efficiently.

DETAILED DESCRIPTION OF THE PREFERRED EMBODIMENTS

The photochromic lens of any of the examples of the invention includes a resin lens substrate in which a spirooxazine photochromic compound, preferably a spirooxazine photochromic compound expressed by Chemical Formula 1 above (such as PSP-33 made by Yamada Chemical Co., Ltd.) is dissolved, mixed and uniformly dispersed, by 0.03 to 0.2 parts by mass based on 100 parts by mass of the resin lens material forming the resin lens substrate, in tetrahydrofuran.

The photochromic lens is formed by mixing a solution of tetrahydrofuran in which a spirooxazine photochromic compound is dissolved into the resin lens material, deaerating the resin lens material to volatilize the tetrahydrofuran, thereby allowing the spirooxazine compound to be deposited and uniformly dispersed in the resin lens material, and forming the resin lens material into the lens substrate by casting.

Resins usable for the resin lens substrate of this invention are not particularly limited, and include resins used for eyeglass resin lenses and other optical lenses, such as acrylic resins, polystyrene resins, polyurethane resins, thiourethane resins, allyl diglycol carbonate (ADC) resins (which are also called "CR-39" resins), polycarbonate resins, and (polyester)methacrylate resins.

If a CR-39 resin is used, this resin is obtained by curing a composition including diethylene glycol-bisallyl carbonate, which is a monomer, and a peroxide added as a catalyst.

The spirooxazine compound expressed by Chemical Formula 1 above loses its photochromic properties if brought into contact with a peroxydicarbonate peroxide. Thus, if a CR-39 resin is used, it is preferable to add, as a catalyst, a peroxyester peroxide or a peroxyketal peroxide instead of diisopropyl peroxydicarbonate (IPP).

Usable peroxyester peroxides include t-hexyl peroxybenzoate (Perbutyl Z, made by NOF Corporation), t-butyl peroxybenzoate, t-hexyl peroxyisopropylmonocarbonate, and t-butyl peroxyacetate. Usable peroxyketal peroxides include 1,1-di(t-butylperoxy)cyclohexane.

The photochromic compound used in the present invention as a photochromic pigment is preferably the spirooxazine photochromic compound expressed by Chemical Formula 1 above. The photochromic compound is added to the resin lens material by 0.03 to 0.2 parts by mass based on 100 parts by mass of the resin lens material. With this arrangement, it is possible to minimize the time until the photochromic lens loses its color, while maintaining sufficient weather resistance. Any other known photochromic compound or compounds may be further added in order to adjust the color tone. The types and contents of such additional photochromic compounds have to be selected such that they do not impair the expected advantages of the present invention.

If the content of the spirooxazine photochromic compound is less than 0.03 parts by mass based on 100 parts by mass of the resin lens material, such a small amount of this compound will be, unable to sufficiently suppress glare from the sunlight even if the lens also contains a different photochromic compound or compounds. It would also be difficult for the lens to lose its color within about five minutes. Considering these tendencies, the content of the spirooxazine photochromic compound is preferably 0.05 parts by mass or over based on 100 parts by mass of the resin lens material.

If the content of the spirooxazine photochromic compound is higher than 0.2 parts by mass, the speed with which the lens loses its color tends to be low, and the initial transmittance (transmittance in a bright atmosphere) also tends to be low. If the lens is used as an eyeglass lens, a slow color losing speed would be especially unfavorable. In view of these tendencies, the content of the spirooxazine compound is more preferably 0.15 parts by mass or under, and further preferably 0.12 parts by mass or under.

As is apparent from the above description, the higher the content of the photochromic compound, the larger the difference between bright and dark but the slower the color losing speed.

According to the present invention, as a solvent in which the spirooxazine photochromic compound expressed by Chemical Formula 1 is dissolved, tetrahydrofuran (hereinafter sometimes abbreviated to "THF") is used.

A spirooxazine photochromic compound is soluble in such organic solvents as hexane, xylene and acetone too. But as is apparent from the experiment results below, if this compound is dissolved in toluene or acetone, it takes 15 minutes or longer for the resulting lens to completely lose its color. If this compound is dissolved in THF, since the solubility of the former in the latter is high, after the solution is mixed in the resin material and the THF is volatilized, the spirooxazine photochromic compound is finely dispersed in the resulting photochromic lens. This makes it possible to minimize the time until the photochromic lens loses its color while maintaining sufficient weather resistance.

Since the photochromic pigment is uniformly dispersed in the resin material of the photochromic lens according to the present invention, the photochromic compound that is present deeper than 0.5 mm from the lens surface is less likely to deteriorate under ultraviolet radiation.

Figure 1:
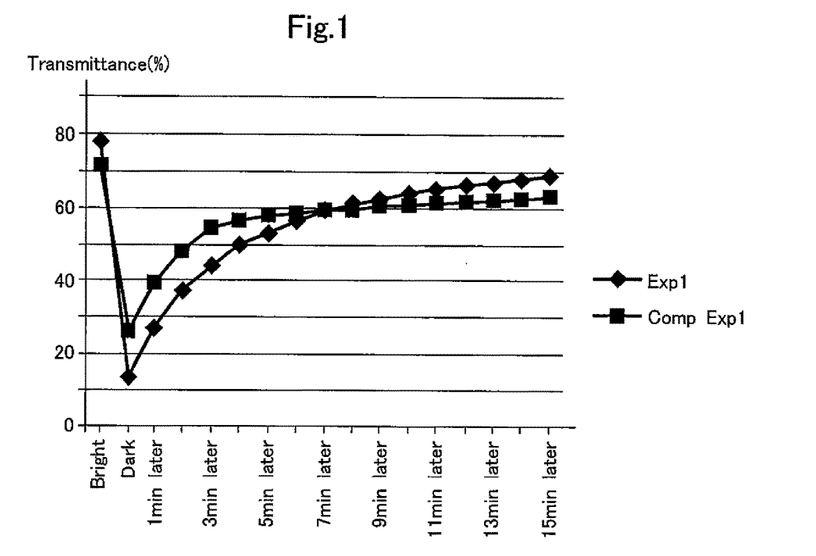
FIG. 1 is a graph showing the relationship between the transmittance and the time passed for Example 1 (of the invention) and Comparative Example 1.

As shown in FIG. 1, when the photochromic lens which contains the spirooxazine photochromic compound expressed by Chemical Formula 1 is fully colored, its darkness becomes maximum because the light having wavelengths near 580 nm is absorbed to the maximum. Thus, not only can this lens shield light effectively due to its photochromic properties, the contrast is also high.

A protective layer may be formed on at least one side of the photochromic lens substrate to further improve the weather resistance of the photochromic lens according to the present invention. The protective layer (also known as a "hard coating" layer or a "guard coating" layer) prevents reflection of ultraviolet radiation and oxidation, thereby improving the weather resistance of the lens. Another advantage of the protective layer is that it is possible to reduce the content of an ultraviolet absorbent in the lens.

The protective layer preferably contains an ultraviolet absorbent, ultraviolet reflecting agent, antioxidant, etc. But excessive addition of an ultraviolet reflecting agent may deteriorate the photochromic properties, though the weather resistance improves.

In order to avoid this problem, the protective layer is preferably made from a mixture of an ultraviolet reflecting hard coating solution containing particulate titanium oxide coated with silicon as an ultraviolet reflecting agent, and Laponite (sodium silicate or magnesium silicate) with an antioxidant further added (this hard coating solution is available from Nippon Fine Chemical Co., Ltd. in the name of NSC-5605D), and a coating solution to reflect and scattering ultraviolet (UV-A and UV-B) radiation, thereby improving the weather resistance.

Antioxidants usable in the protective layer include IRGANOX 1135 and IRGASTAB PUR 68, both made by BASF, which are both suitable as an additive to polyurethane.

As for the color tone balance, sunglasses ordinarily use one of two colors, i.e. gray and brown. Since there is no single gray or brown photochromic compound, a plurality of different colored photochromic pigments are ordinarily mixed together to adjust the color tone.

Since the photochromic compound according to the present invention which is expressed by Chemical Formula 1 is reddish-purple in color, the lens color can be adjusted to gray or brown by mixing together this photochromic compound and other two photochromic compounds, i.e. a blue one (PSP-54, made by Yamada Chemical Co., Ltd.) and an orange one (PSP-73 or PSP-92, both made by Yamada Chemical, or a mixture thereof).

Figure 7:
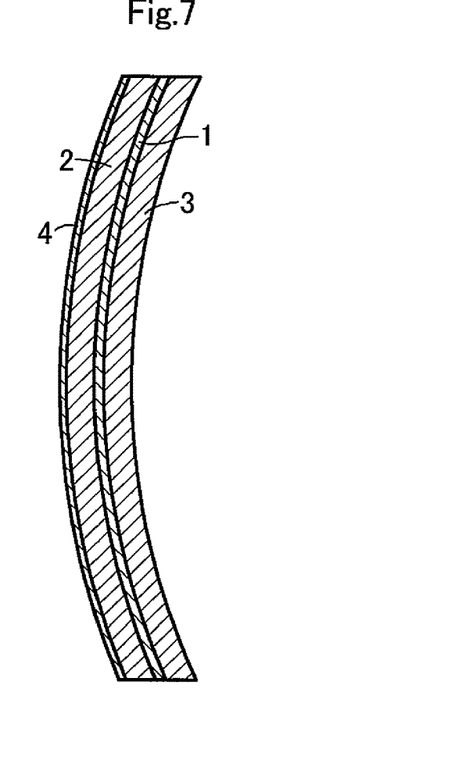
FIG. 7 is a sectional view of a photochromic polarized lens embodying the present invention.

FIG. 7 shows a photochromic lens according to a specific embodiment of the present invention, which is a photochromic polarized lens including a polarizing film layer. The polarizing film layer improves anti-glare properties of the lens.

In particular, the photochromic polarized lens (hereinafter sometimes simply referred to as the "polarized lens") of FIG. 7 includes a polarized lens substrate including a polarizing element (film) 1 formed by subjecting a plastic film to polarizing treatment, and plastic base layers 2 and 3 in which a photochromic compound is uniformly dispersed and integrally laminated on the respective sides of the polarizing film 1, and the above-mentioned protective layer 4, which is provided on one side of the polarized lens substrate. The protective layer 4 may be provided on one side of a non-polarized photochromic lens substrate too.

Figure 8:
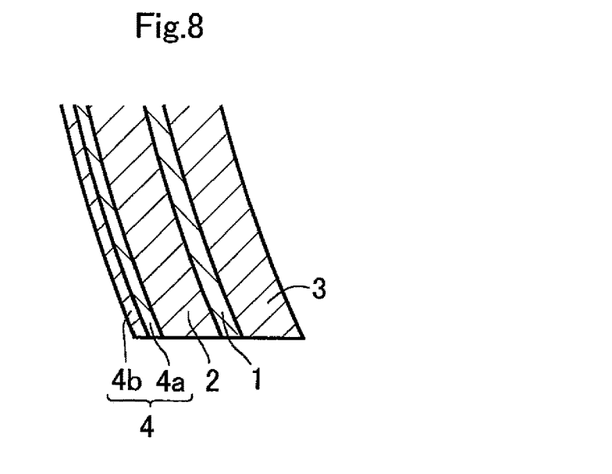
FIG. 8 is an enlarged sectional view of a portion of the polarized lens of FIG. 7.

As shown in FIG. 8, the protective layer 4 may be a composite layer including a first sub-layer 4a made of resin and containing e.g. an antioxidant, and a second metal deposition sub-layer 4b laminated on the first sub-layer 4a.

The polarizing film used in this polarized lens can be manufactured with a known method. For example, the polarizing film may be formed by incorporating iodine or an iodine compound into a polyvinyl alcohol film by e.g. impregnation, and then uniaxially stretching the film.

A polarized lens for eyeglasses is formed e.g. by placing the polarizing film in the cavity of a mold for forming lenses by insert molding such that gaps of e.g. 1 to 15 mm are defined between the respective sides of the polarizing film and the inner wall of the cavity, and injecting a lens material into both gaps until the polarizing film is embedded in the lens material. The lens substrate thus formed, which includes the polarizing film 1 and the plastic base layers 2 and 3, are ground and/or polished to a required lens power.

Alternatively, such a polarized lens for eyeglasses may be formed by separately forming the plastic base layers 2 and 3, and integrally laminating the plastic base layers 2 and 3 on the respective sides of the polarizing film 1.

A hard coating layer, as the protective layer, may be formed on the photochromic lens substrate by immersing the lens substrate in a solution containing e.g. a silicon compound to increase the surface hardness of the lens. The protective layer may be subjected to stainproof treatment, anti-reflection treatment, chemical resistance treatment, anti-static treatment, mirror finish treatment, and/or any other known treatment to further effectively protect the lens.

EXAMPLES

Example 1

Based on 100 parts by mass of a prepolymer (not containing an ultraviolet absorbent) obtained by reacting a polyisocyanate with a polyhydroxy compound, 0.05 parts by mass of the spirooxazine photochromic compound (PSP-33, made by Yamada Chemical Co., Ltd.; reddish purple in color), 0.02 parts by mass of a bluish green spirooxazine photochromic compound (PSP-54, made by Yamada Chemical), and 0.06 parts by mass of an orange colored photochromic compound (PSP-92, made by Yamada Chemical) were dissolved in tetrahydrofuran (THF), and the THF was added to the prepolymer. The prepolymer and the THF were then mixed together, and the mixture was stirred and deaerated under vacuum. An aromatic polyamine (4,4'-methylenebis (2-chloroaniline, "MOCA") was added to this prepolymer as a curing agent of an equivalent amount, and the prepolymer was formed into the lens by casting.

In particular, a photochromic lens for eyeglasses according to the present invention was obtained by injecting a liquid state resin material, i.e. the above-described prepolymer, into a cavity of a glass mold which is defined by opposed convex and concave surfaces, gradually heating the mold from the normal temperature to 120° C., curing the prepolymer for four hours at 120° C., cooling it, removing it from the mold, and annealing it for two hours at 100° C.

The thus obtained photochromic lens was irradiated with ultraviolet light from an irradiator for five minutes. For 15 minutes immediately thereafter, the transmittance and the change in color tone with time were measured with a color difference meter. The measurement results are shown in FIG. 1.

Comparative Example 1

A lens was formed by casting in exactly the same manner as in Example 1 except that acetone was used instead of tetrahydrofuran (THF), and the transmittance and the change in color tone with time were measured with a color difference meter under the same test conditions as in Example 1. The measurement results are shown in FIG. 1.

As is apparent from the test results of FIG. 1, because the solubility of the spirooxazine photochromic compound expressed by Chemical Formula 1 in acetone is low, the photochromic lens of Comparative Example 1 was significantly inferior in photochromic properties (difference between bright and dark). Longer time was needed until the lens regained its color before being exposed to ultraviolet radiation.

On the other hand, before being exposed to ultraviolet radiation, the photochromic lens of Example 1 was higher in transmittance by about 7% than the lens of Comparative Example 1, and thus was brighter than Comparative Example 1. Still, when exposed to ultraviolet radiation, the transmittance of the lens of Example 1 decreased to the level about 12% lower than that of Comparative Example 1. Still further, when ultraviolet radiation was stopped, the transmittance quickly recovered such that eight minutes after termination of ultraviolet radiation, the transmittance of the lens of Example 1 was higher than that of Comparative Example 1. This means that the lens of Example 1 can more quickly lose its color than the lens of Comparative Example 1.

Example 2

Two photochromic lens substrates were separately prepared by casting in which each of gray and brown plane polarizing films having a transmittance of 30% was set in a cavity of a glass mold defined by convex and concave surfaces and sealed by a gasket such that gaps of 2 mm were defined between the polarizing film and the convex surface and between the polarizing film and the concave surface, the same liquid-state resin material as used in Example 1 was injected into the cavity of the mold, and the resin material was gradually heated from the room temperature to 120° C., cured at 120° C. for four hours, cooled, removed from the mold, and annealed for two hours at 100° C.

A coating of an ultraviolet reflecting type antioxidant (NSC-5605D, made by Nippon Fine Chemical Co., Ltd.) was formed on the surface of the thus obtained lens substrate to obtain the photochromic lens of Example 2.

The thus obtained photochromic lenses were exposed to weather conditions created in a weathering tester (Q-UV, made by Q-Lab Corporation) for 120 hours. Before and after the test, the photochromic lenses were exposed to ultraviolet radiation from an ultraviolet radiator for five minutes, and then their transmittance and change in color tone were measured using a color difference meter. Measurement results are shown in FIG. 2.

Figure 2:
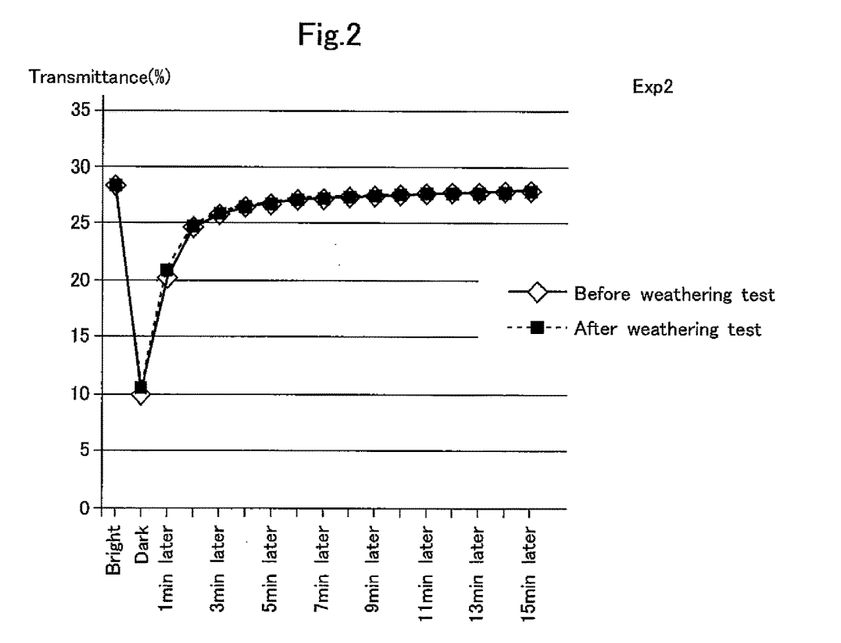
FIG. 2 is a graph showing the relationship between the transmittance and the time passed for Example 2 (of the invention) before and after a weathering test.

As will be apparent from the results of FIG. 2, the photochromic lenses of Example 2, including the coating layer formed by applying a hard coating solution containing an ultraviolet reflecting type antioxidant, efficiently showed the photochromic properties inherent to the photochromic compound, lost their color in a shorter period of time, and scarcely deteriorated after being exposed to harsh weather conditions.

Example 3

Photochromic lenses were produced in exactly the same manner as in Example 2, except that instead of the ultraviolet reflecting type hard coating solution (NSC-5605D, made by Nippon Fine Chemical Co., Ltd.), an ultraviolet absorbing type hard coating solution containing an ultraviolet absorbent (NSC-5605C, made by Nippon Fine Chemical) was applied to the surface of the lens substrate obtained. The photochromic lenses thus obtained were subjected to the same weathering test. The measurement results are shown in FIG. 3.

Figure 3:
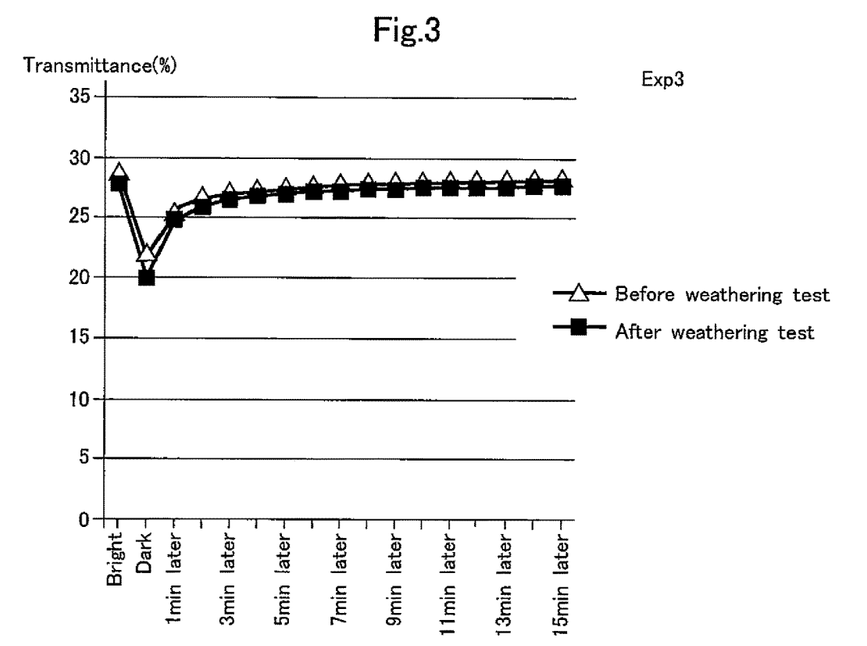
FIG. 3 is a graph showing the relationship between the transmittance and the time passed for Example 3 (of the invention) before and after a weathering test.

As will be apparent from the results of FIG. 3, the photochromic lenses of Example 3, including a coating layer (hard layer) which absorbs ultraviolet radiation, can lose its color quickly and scarcely deteriorates after being exposed to harsh weather conditions, though the initial photochromic properties (transmittance) inherent to the photochromic compound are slightly low.

Example 4

Photochromic lenses were produced in exactly the same manner as in Example 2, except that instead of the ultraviolet reflecting type hard coating solution (NSC-5605D, made by Nippon Fine Chemical Co., Ltd.), a hard coating solution containing no ultraviolet absorbent (NSC-5100, made by Nippon Fine Chemical) was applied to the surface of the lens substrate obtained. The photochromic lenses thus obtained were subjected to the same weathering test. The measurement results are shown in FIG. 4.

Figure 4:
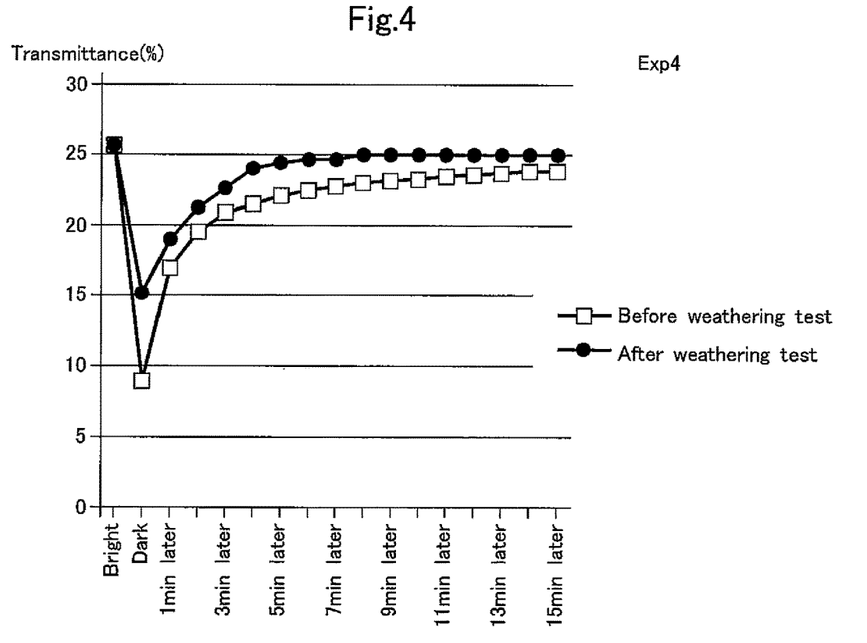
FIG. 4 is a graph showing the relationship between the transmittance and the time passed for Example 4 (of the invention) before and after a weathering test.

As is apparent from the results of FIG. 4, the photochromic lenses of Example 4, including the coating formed by applying the hard coating solution containing no ultraviolet absorbent, show, before the weathering test, photochromic properties (transmittance) inherent to the photochromic compound and were similar to those of the lens including the coating formed by applying the ultraviolet reflecting type hard coating solution. But after the weathering test, the photochromic properties slightly deteriorate because ultraviolet radiation deteriorates the lens substrate to the depth of about 0.5 mm from its surface. But the lens can still lose its color in a short time due to the specific photochromic compound contained in the lens substrate.

Examples 5 and 6 and Comparative Examples 2 and 3

Polarized photochromic lenses of Comparative Example 2, Examples 5 and 6 and Comparative Example 3 were produced in exactly the same manner as in Example 2, except that the spirooxazine photochromic compound expressed by Chemical Formula 1 (PSP-33, reddish purple, made by Yamada Chemical Co., Ltd.) was added by 0.01 parts by mass (Comparative Example 2), 0.08 parts by mass (Example 5), 0.12 parts by mass (Example 6), and 0.50 parts by mass (Comparative Example 3), respectively.

The photochromic lenses thus obtained were exposed to ultraviolet radiation from an ultraviolet radiator for five minutes, and for 15 minutes immediately thereafter, the transmittance and the change in color with time were measured for each lens using a color difference meter. The measurement results are shown in FIG. 5.

Figure 5:
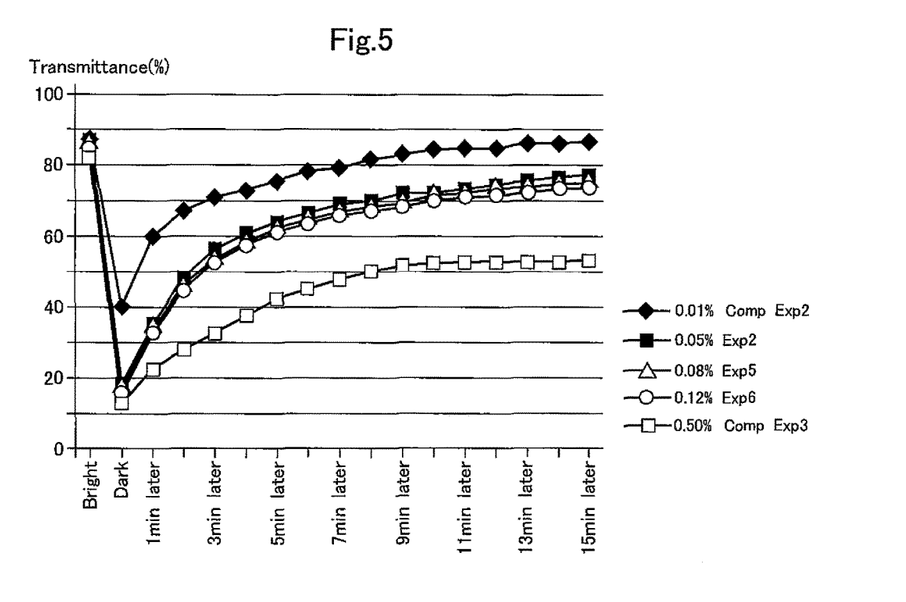
FIG. 5 is a graph showing the relationship between the transmittance and the time passed for Examples 2, 5 and 6 (of the invention) and Comparative Examples 2 and 3.

As is apparent from FIG. 5, it was confirmed that photochromic lenses formed by mixing and uniformly dispersing 0.05 to 0.12 parts by mass of a spirooxazine photochromic compound in 100 parts by mass of a resin lens material with the photochromic compound dissolved in tetrahydrofuran, such as those of Examples 2, 5 and 6, can lose its color in a shorter period of time and efficiently reveal the photochromic properties intrinsic to this compound.

The lens of Comparative Example 2 cannot sufficiently reveal photochromic properties because the content of the spirooxazine photochromic compound was too low, while the lens of Comparative Example 3 needed a long period of time to lose its color and it was actually impossible to sufficiently lose its color, because the lens of Comparative Example 3 contained an excessive amount of the above compound.

Example 7

Photochromic lenses each including a lens substrate integral with a polarizing film were prepared in the same manner as in Example 2 except that the bluish green spirooxazine photochromic compound and the orange colored photochromic compound were not used.

For the thus obtained photochromic lenses, the spectral transmittance was measured in a bright environment, where the photochromic compound reacts, and in a dark environment, where the photochromic compound does not react, using a spectrophotometer. The measurement results are shown in FIG. 6.

Figure 6:
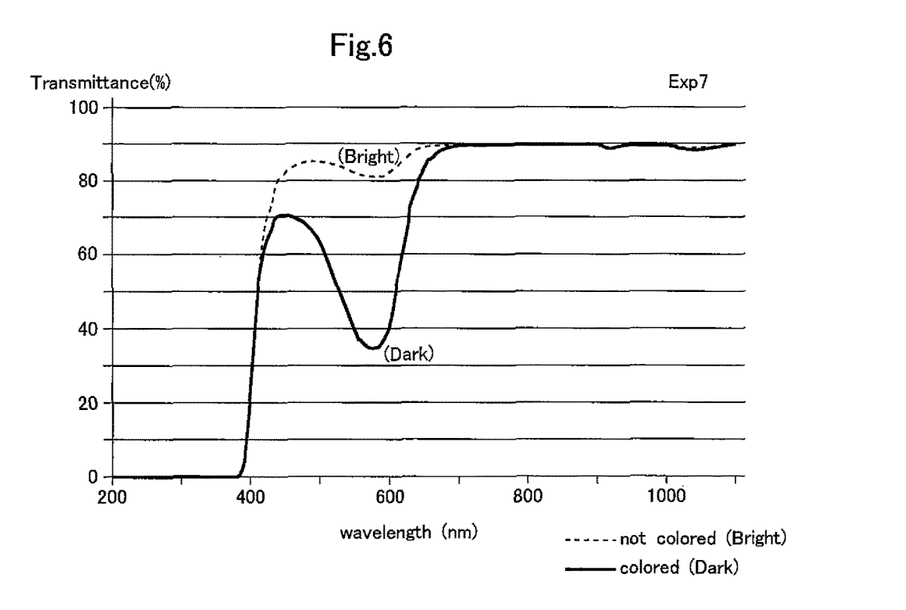
FIG. 6 is a graph showing the relationship between the spectral transmittance and the wavelength when the lens of Example 7 was used in a bright environment (not colored) and in a dark environment (colored)

As is apparent from FIG. 6, the spirooxazine photochromic compound expressed by Chemical Formula 1 (PSP-33, made by Yamada Chemical Co., Ltd.; reddish purple) absorbs light having wavelengths near 580 nm in a dark environment. Thus the lenses of Example 7 can quickly shield light, and also show excellent contrasting properties due to the ability of the above photochromic compound to shied light of the specific wavelengths. Through such lenses, one can obtain a clear view of e.g. a landscape.

As additional examples, photochromic lenses were prepared in the same manner as in Example 1, except that as the resin lens material, instead of a prepolymer of a urethane resin, a CR monomer of an allyl diglycol carbonate resin (CR-39 resin), and a high-refractive monomer of a thiourethane resin were used, respectively. The thus obtained photochromic lenses were irradiated with ultraviolet radiation from an irradiator for five minutes, and for 15 minutes immediately thereafter, the transmittance and the change in color tone with time were measured with a color difference meter, in the same manner as in Example 1. The measurement results were substantially the same as the results of Example 1, which indicates that the kind of the resin material used does not significantly influence the photochromic properties of the lens and the time until color disappears.

Comparative Example 4

A photochromic layer having a thickness of 20 μm was formed on the below-described polyurethane polarized lens substrate, having a thickness of 2.0 mm, by dipping the lens substrate in the below-described coating solution.

That is, the polyurethane polarized lens substrate was prepared by adding an aromatic polyamine (MOCA) as a curing agent to a prepolymer (not containing an ultraviolet absorbent) obtained by reacting a polyisocyanate with a polyhydroxy compound, and forming the prepolymer by casting.

The coating solution was prepared by dissolving 0.05 parts by mass of the spirooxazine photochromic compound (PSP-33, made by Yamada Chemical Co., Ltd; reddish purple in color), 0.02 parts by mass of a bluish green spirooxazine photochromic compound (PSP-54, made by Yamada Chemical), and 0.06 parts by mass of an orange colored photochromic compound (PSP-92, made by Yamada Chemical), based on 100 parts by mass of the lens substrate, in tetrahydrofuran (THF), agitating the mixture, and deaerating under vacuum the mixture so that when the lens substrate is dipped in this solution, a photochromic layer is formed which is 1/100 of the thickness of the lens substrate.

After dipping the lens substrate in this coating solution, the lens substrate was dried to form a photochromic layer having a thickness of 20 μm on the lens substrate.

Before a weathering test, the lens thus obtained showed performance equivalent to that of the lens in which the photochromic compound is kneaded in the lens substrate. After the weathering test, its performance deteriorated significantly.

What is claimed is:

1. A photochromic lens for eyeglasses comprising a resin lens plastic base layer and a polarizing film integral with the resin lens plastic base layer, whereby the photochromic lens is polarized, wherein the resin lens plastic base layer comprises 100 parts by mass of a polyurethane resin, and 0.05 to 0.12 parts by mass of a spirooxazine photochromic compound expressed by Chemical Formula 1 below

[Chemical Formula 1]

wherein the spirooxazine photochromic compound is uniformly dispersed in the resin lens plastic base layer, wherein the polyurethane resin is obtained by adding 4,4'-methylenebis(2-chloroaniline) to a prepolymer obtained by reacting a polyisocyanate with a polyhydroxy compound to provide a mixture, and heating and curing the mixture, wherein the resin lens plastic base layer is formed by dissolving the spirooxazine compound in tetrahydrofuran to obtain a solution, mixing the solution into the polyurethane resin to obtain a mixture, deaerating the mixture to volatilize the tetrahydrofuran to obtain a deaerated mixture, and forming the deaerated mixture into the resin lens plastic base layer by injecting the deaerated mixture into a mold, and curing the deaerated mixture, wherein the resin lens plastic base layer has a thickness of 1 to 15 mm, and wherein the photochromic lens is suitable as an eyeglass lens.

2. The photochromic lens of claim 1, further comprising a protective layer formed on a surface of the resin lens plastic base layer.

3. The photochromic lens of claim 2, wherein the protective layer contains an ultraviolet reflecting agent and an antioxidant.

4. The photochromic lens of claim 2, wherein the protective layer comprises a first sub-layer and a second metal deposition sub-layer formed on a surface of the first sub-layer.

5. The photochromic lens of claim 3, wherein the protective layer comprises a first sub-layer and a second metal deposition sub-layer formed on a surface of the first sub-layer.

6. The photochromic lens of claim 1, wherein the resin lens plastic base layer is integrally laminated on the respective sides of the polarizing film layer.

7. A photochromic lens for eyeglasses consisting of a resin lens plastic base layer, a polarizing film integral with the resin lens plastic base layer, whereby the photochromic lens is polarized, and, optionally, one or more layers formed on a surface of the resin lens plastic base layer, wherein the resin lens plastic base layer comprises 100 parts by mass of a polyurethane resin, and 0.05 to 0.12 parts by mass of an a spirooxazine photochromic compound expressed by Chemical Formula 1 below

[Chemical Formula 1]

wherein the spirooxazine photochromic compound is uniformly dispersed in the resin lens plastic base layer, wherein the polyurethane resin is obtained by adding 4,4'-methylenebis(2-chloroaniline) to a prepolymer obtained by reacting a polyisocyanate with a polyhydroxy compound to provide a mixture, and heating and curing the mixture, wherein the resin lens plastic base layer is formed by dissolving the spirooxazine compound in tetrahydrofuran to obtain a solution, mixing the solution into the polyurethane resin to obtain a mixture, deaerating the mixture to volatilize the tetrahydrofuran to obtain a deaerated mixture, and forming the deaerated mixture into the resin lens plastic base layer by injecting the deaerated mixture into a mold, and curing the deaerated mixture, wherein the resin lens plastic base layer has a thickness of 1 to 15 mm, and wherein the photochromic lens is suitable as an eyeglass lens.

8. The photochromic lens of claim 7, consisting of a resin lens plastic base layer, a polarizing film integral with the resin lens plastic base layer, whereby the photochromic lens is polarized, and one or more layers formed on a surface of the resin lens plastic base layer, wherein the one or more layers are protective layers.

9. The photochromic lens of claim 8, wherein the protective layers contain at least one of ultraviolet reflecting agents and antioxidants.

10. The photochromic lens of claim 8, wherein the protective layers comprise a first sub-layer and a second metal deposition sub-layer formed on a surface of the first sub-layer.

11. The photochromic lens of claim 9, wherein the protective layers comprise a first sub-layer and a second metal deposition sub-layer formed on a surface of the first sub-layer.

12. The photochromic lens of claim 7, wherein the resin lens plastic base layer is integrally laminated on the respective sides of the polarizing film layer.

* * * * *